United States Patent Office 3,127,389
Patented Mar. 31, 1964

3,127,389
ORGANIC DYESTUFFS
Karl Seitz, Neu-Allschwil, and Henri Riat, Arlesheim, Switzerland, assignors to Ciba Corporation, a corporation of Delaware
No Drawing. Filed May 18, 1961, Ser. No. 110,903
Claims priority, application Switzerland May 23, 1960
12 Claims. (Cl. 260—146)

This invention provides organic dyestuffs which contain a pyridazine radical that contains at least one halogen atom and a further electronegative substituent, which latter substituent includes inter alia a halogen atom.

Especially valuable are water-soluble dyestuffs of this kind which contain, in addition to at least one or preferably more than one group imparting solubility in water, a dichloro- or dibromo-pyridazine radical which contains in addition to the halogen atoms an electronegative substituent, such as a nitro or cyano group or preferably a further halogen atom.

The pyridazine radical may be bound directly or through a bridge member, for example, to an oxygen, sulfur or advantageously a nitrogen atom of the dyestuff molecule. The said nitrogen atom may be further substituted by an aliphatic, cycloaliphatic, araliphatic or aromatic radical. Especially valuable are acid dyestuffs as defined above which contain at least one group of the formula

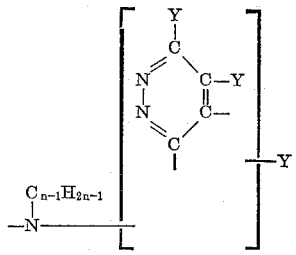

in which $n$ represents a whole number not greater than 6, and each $Y$ represents a halogen atom.

In addition to a group of the above formula, which may be bound through an alkylene radical or through a —CO— or —SO$_2$— group or advantageously directly to an aromatic ring of the dyestuff molecule, the dyestuffs of the invention may contain at least one group imparting solubility in water, for example, a sulfonic acid amide group which may be acylated, a methyl sulfone group, one or preferably more than one ionized strongly acid group imparting solubility in water, such as an HO$_3$S—O— group, a carboxylic acid or sulfonic acid group. They may also contain further substituents, more especially those not imparting solubility in water, such as halogen atoms or nitro, acylamino, alkyl or alkoxy groups.

The dyestuffs of the invention can be made from dyestuff components of which at least one contains one of the aforesaid substituents, for example, by coupling or by diazotization and coupling. Such dyestuff components containing a halogen-pyridazine radical can be made by methods in themselves known, for example, by the Friedel-Crafts condensation or by the condensation of an acylatable compound with an at least dihalogenated pyridazine which contains an electronegative substituent, for example, one or two further halogen atoms, and especially with 3:4:6-tribromo- or 3:4:6-trichloro-pyridazine, 3-phenyl-4:5:6-trichloro-pyridazine, 2-phenyl-5:6-dichloro-3-hydroxy-2:3-dihydro-pyridazine or advantageously 3:4:5:6-tetrabromo- or 3:4:5:6-tetrachloro-pyridazine or 4:5-dibromo-3:6-dichloropyridazine.

As examples of amines of which the diazo-compounds may be used, there may be mentioned, for example, the following amines:

Aniline, o-, m-, p-toluidine, o-anisidine, chloro- and/or 1-aminobenzene-2-, -3- or -4-sulfonic acid,
1-aminobenzene-3- or -4-carboxylic acid,
1-aminobenzene-2:5-disulfonic acid,
4-amino-1-methoxybenzene-2-sulfonic acid,
2-amino-1-methoxybenzene-4-sulfonic acid,
3-amino-6-oxybenzoic acid-5-sulfonic acid,
5-acetylamino-2-aminobenzene-1-sulfonic acid,
4-acetylamino-2-aminobenzene-1-sulfonic acid,
5-acetylamino- or 5-benzoylamino-2-aminobenzene-1-carboxylic acid,
1-amino-3-(2':4'-dichlorotriazinyl-(6))-aminobenzene-4-sulfonic acid,
1-amino-3-(2'-chloro-4'-aminotriazinyl-(6))-aminobenzene-4-sulfonic acid,
chloro- or nitro-aminobenzene-sulfonic acid,
1-aminonaphthalene-4-, -5-, -6- or -7-sulfonic acid,
2-aminonaphthalene-4-, -6-, -7- or -8-sulfonic acid,
2-aminonaphthalene-1-sulfonic acid,
1-aminonaphthalene-3:6-disulfonic acid,
2-aminonaphthalene-1:5-disulfonic acid,
2-aminonaphthalene-3:6-, -4:8-, -5:7- or -6:8-disulfonic acid,
1-(3'- or 4'-aminobenzoyl)-aminobenzene-3-sulfonic acid,
3-aminopyrene-8- or -10-monosulfonic acid,
3-aminopyrene-5:8- or -5:10-disulfonic acid,
4-nitro-4'-aminostilbene-2:2'-disulfonic acid,
O-acyl-derivatives of aminonaphthol-sulfonic acids, for example, O-acyl-derivatives of 1-amino-8-oxynaphthalene-3:6- or -4:6-disulfonic acid.

Dehydrothiotoluidine sulfonic acid, and also other amines that lead to the formation of metallisable dyestuffs, such as 4-chloro-, 4-nitro- or 4-methyl-2-aminophenol,
6-chloro, 6-nitro- or 6-acetylamino-2-aminophenol-4-sulfonic acid,
2-aminophenol-4- or-5-sulfonic acid,
3-amino-2-oxybenzoic acid-5-sulfonic acid,
2-aminophenol-4- or -5-sulfonic acid amide,
4:6-dinitro- or 4:6-dichloro-2-aminophenol,
4-chloro- or 4-nitro-2-aminophenol-6-sulfonic acid,
4-nitro-6-chloro-2-aminophenol,
4-nitro-6-acetylamino-2-aminophenol;

and also condensation products of the aforesaid at least dihalogenated pyridazines with, for example, monamines which contain, in addition to a sufficiently basic amino group to react with the at least dihalogenated pyridazine, a substituent convertible into a diazotizable amino group, or with diamines capable of being monoacylated. Especially suitable for such monoacylation are aromatic diamines which contain in o-position to an amino group a negative substituent, for example, a sulfonic acid or carboxylic acid group or a chlorine atom, for example, 2:4-diaminobenzene-1-sulfonic acid or 1:4-diaminobenzene-2-sulfonic acid. As examples of coupling components to be used in the process of the invention there may be mentioned:

1-(2':5'-dichlorophenyl)-3-methyl-5-pyrazolone-4'-sulfonic acid,
1-(2'-chlorophenyl)-3-methyl-5-pyrazolone-5'-sulfonic acid,
1-naphthyl-2-(2')-3-methyl-5-pyrazolone-4':8'-disulfonic acid,
1-(2'-chloro-phenyl)-3-methyl-5-aminopyrazole-5'-sulfonic acid,
Acetoacetic acid ortho-anisidide,
Barbituric acid,
2-hydroxy-naphthalene-6-sulfonic acid,
2-hydroxy-naphthalene-3:6-disulfonic acid,
2-hydroxy-naphthalene-6:8-disulfonic acid,
2-naphthylamine-5:7-disulfonic acid,
1-hydroxy-naphthalene-4-sulfonic acid,
1-hydroxy-naphthalene-3:6-disulfonic acid,
1-aminonaphthalene-6- or -7-sulfonic acid,
Meta-toluidine, cresidine, aminohydroquinone dimethyl ether,
Acetyl-m-phenylenediamine, 2-acryloylamino-5-oxynaphthalene-7-sulfonic acid, 1-acryloylamino-8-oxynaphthalene-3:6-disulfonic acid,
5-ureido-5-hydroxy-naphthaline-7-sulfonic acid,
1-acetylamino-8-hydroxy-naphthalene-3:6-disulfonic acid,
1-benzoylamino-8-hydroxy-naphthalene-3:6-disulfonic acid,
1-benzoylamino-8-hydroxy-naphthalene-4:6-disulfonic acid,
1-amino-2-(4'-nitro-phenylazo)-8-hydroxy-naphthalene-3:6-disulfonic acid, and also the copper complex or the 1:2-cobalt complex of 1-hydroxy-2-(2':4'-dihydroxy-phenylazo)-benzene-4-sulfonic acid;

and also condensation products of the aforesaid at least dihalogenated pyridazines with compounds which contain, in addition to an amino or hydroxyl group or a ketomethylene group that makes coupling possible, an amino group capable of being acylated with at least dihalogenated pyridazines or a substituent convertible into such an amino group after coupling, for example, 2-amino-5-oxynaphthalene-7-sulfonic acid and N-acyl-derivatives thereof. As stated above, the combination of the two components must be so chosen that at least one of them contains the aforesaid pyridazine radical.

Instead of using dyestuff components which already contain the aforesaid halogen-pyridazine radicals, these radicals may be introduced into the preformed dyestuffs. Thus, there are obtained by reacting dyestuffs which contain a group capable of being acylated with at least dihalogenated pyridazines, and preferably a primary amino group, for example, with tetrabromo- or tetrachloro- pyridazine, valuable dyestuffs which contain reactive substituents capable of reacting chemically with textile materials, such as wool or cotton.

As organic dyestuffs which can be obtained in the manner previously described or by condensation with the aforesaid polyhalogen-pyridazines in the presence of a Friedel-Crafts catalyst, there are included dyestuffs belonging to a very wide variety of classes, for example, nitro-dyestuffs, stilbene dyestuffs, acridone, thioxanthone, azine, thiazine and dioxazine dyestuffs, acid phthalocyanine dyestuffs, acid anthraquinine dyestuffs and especially azo-dyestuffs including metal-free and metalliferous monoazo- and polyazo-dyestuffs. Especially good results are obtained with soluble azo-dyestuffs which have no pronounced affinity for cotton and contain more than one acid group imparting solubility in water.

As examples of dyestuffs containing acylatable amino groups, which can be used as starting materials in the process, there may be mentioned: amino-azo-dyestuffs obtainable by the hydrolysis acylamino-azo-dyestuffs, by the reduction of the nitro-group in nitro-azo-dyestuffs or by coupling diazotized aromatic amines with coupling components containing acylatable amino groups, for example, 1-amino-3-alkyl- or 1-amino-3-acylaminobenzenes, β-keto-carboxylic acid arylides, meta- or para-aminophenyl - 5 - pyrazolones, amino-naphthol-sulfonic acids, especially those which contain the amino group in β-position, for example 2-amino-8-oxynaphthalene-6-sulfonic acid and 3-amino-8-oxynaphthalene-6-sulfonic acid or the like; also amino-monoazo-dyestuffs obtainable by coupling diazo-coupling components hereinbefore mentioned; amino-dyestuffs of the anthraquinone series, such as 1-amino-4-(3'- or -4'-aminophenylamino)-anthraquinone-2 - sulfonic acid, 1-amino-4-(4'-aminophenylamino)-anthraquinone-2'-sulfonic acid, 1-amino-4-(4'-aminophenylamino) - anthraquinone-2:2'-disulfonic acid, 1-amino-4-(4-'aminophenylamino)-anthraquinone-2:2':5-trisulfonic acid, and also 1:5-dihydroxy-4:8-diaminoanthraquinone-2:6-disulfonic acid, 1:4- or 1:5-diamino-anthraquinone-2-sulfonic acid; furthermore there are obtained, for example, from one mol of a di-, tri- or tetra-sulfonic acid chloride of a colored anthraquinone derivative or one mol of a phthalocyanine tri- or tetra-sulfonic acid chloride by partial amidation with one mol of a diamine, for example, with one mol of a diamino-benzene sulfonic acid or a monoacyl-derivative thereof. Very valuable dyestuffs suitable as starting materials which, after hydrolysis of the unreacted sulfonic acid chloride groups and any acylamino group that may be present, contain an acylatable amino group which can be condensed, for example, with a trichloropyridazine or with tetrachloro-pyridazine.

The dyestuffs of the invention can also be obtained by condensing, for example, a phthalocyanine or anthraquinone sulfochloride with an acylatable amine containing one of the aforesaid pyridazine radicals, for example, with an aminophenyl-amino-di- or tri-chloropyridazine.

The condensation of the compounds used as dyestuff components, for example, as diazo- or coupling components, and of the dyestuffs containing an acylatable amino group, with the halogenated pyridazines is advantageously carried out in the presence of an acid-binding agent, such as sodium acetate, sodium hydroxide or sodium carbonate, for example, in an organic solvent or an aqueous or organic-aqueous medium.

The dyestuffs of this invention are suitable for dyeing or printing a very wide variety of materials, especially polyhydroxylated materials of fibrous structure, such as cellulosic materials, and synthetic fibers, for example, of regenerated cellulose, or natural materials, for example, linen or especially cotton. In the case of water-soluble dyestuff they are suitable for dyeing by the so-called direct dyeing method and are also suitable for printing or pad-dyeing methods. The dyestuffs can be fixed on the goods to be dyed chemically by treatment with an alkali and heat, for example, steaming.

In order to improve their properties of wet fastness it is of advantage to subject dyeings or prints so produced to thorough rinsing with cold and hot water, if desired, with the addition of an agent having a dispersing action or capable of assisting the diffusion of non-fixed dyestuff.

The dyeings produced on cellulosic fibers with the dyestuffs of the invention are in general distinguished by the purity of their tints, by their good fastness to light and especially by their excellent properties of wet fastness.

The water-soluble dyestuffs of the invention are also suitable for dyeing or printing nitrogenous textile materials, such as leather, silk and especially wool, and also polyamide or polyurethane fibers, from a weakly alkaline, neutral or acid bath, for example, an acetic acid bath.

The dyeings produced with such dyestuffs on wool are distinguished by their excellent fastness to washing and fulling.

For the purpose of stabilization there may be mixed with the dyestuffs as extenders, buffers, for example, borates or phosphates or a mixture of monosodium and disodium phosphate.

The following examples illustrate the invention, the parts of percentages being by weight:

*Example 1*

9.4 parts of 2:4-diaminobenzene-1-sulfonic acid are dissolved in 300 parts of water and 15 parts of anhydrous sodium acetate are added. There is then added a solution of 13.08 parts of 3:4:5:6-tetrachloropyridazine in 150 parts of alcohol, and the mixture is heated under reflux (temperature of 80 to 85° C.) for 10 to 15 hours. After being cooled, the reaction mixture is diluted with water, and the resulting clear solution is acidified with about 25 parts of concentrated hydrochloric acid. The precipitated product is filtered off, and washed with an aqueous solution of sodium chloride and dried in vacuo at 60 to 65° C. The condensation product so obtained has the formula

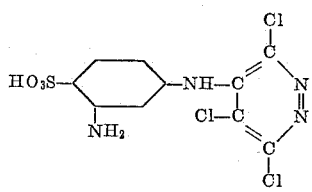

or the formula

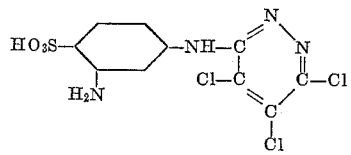

or consists of a mixture of compounds of these formulae.

7.39 parts of the above condensation product in 300 parts of water are neutralized with sodium carbonate, and diazotized at 5° C. with 10 parts of a 2 N-solution of sodium nitrite and 5 parts of concentrated hydrochloric acid. The yellow suspension of the diazo-compound is then poured into an ice-cold solution of 6.46 parts of 1-(2':5'-dichlorophenyl)-3-methyl-5-pyrazolone-4'-sulfonic acid and 15 parts of sodium bicarbonate in 300 parts of water. After coupling has occurred, the dyestuff is filtered off, washed with sodium chloride solution of 15% strength and dried in vacuo at 60 to 65° C. The dyestuff so obtained dyes cotton in the manner described in Example 4 greenish-yellow tints of excellent fastness to washing.

By using, instead of 1-(2':5'-dichlorophenyl)-3-methyl-5-pyrazolone-4'-sulfonic acid, a corresponding quantity of one of the coupling components given in column II of the following table and otherwise proceeding in the manner described in the second paragraph of this example, there is obtained a dyestuff which dyes cotton the tint given in column III.

| I | II | III |
|---|---|---|
| 15 | ![structure: 1-hydroxy-2-amino-naphthalene-disulfonic acid azo-coupled to 4-nitrophenyl] | Greenish blue. |
| 16 | ![structure: 4-sulfo-2-hydroxyphenyl-azo-2,4-dihydroxyphenyl] | Brown. |
| 17 | 1:2-cobalt complex of: ![structure: 4-sulfo-2-hydroxyphenyl-azo-2,4-dihydroxyphenyl] | Do. |

*Example 2*

21.9 parts of the dyestuff of the formula

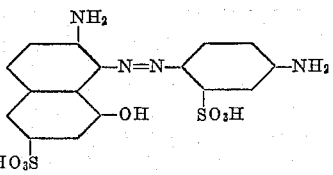

are neutralized in 300 parts of water with sodium carbonate, and 15 parts of anhydrous sodium acetate are added. To the solution so obtained is added a solution of 15 parts of 3:4:5:6-tetrachloropyridazine in 150 parts of alcohol, and the whole is heated for 10 to 15 hours under reflux. After cooling the mixture, the dyestuff is completely precipitated with sodium chloride, and is then filtered off and dried. The product so obtained dyes cotton in the manner described in Example 4 bluish-red tints.

By using, instead of the dyestuff of the above formula, corresponding quantities of the dyestuffs mentioned in column II of the following Table and acylating their amino group with 3:4:5:6-tetrachloropyridazine in the manner described in this example, there are obtained dyestuffs which dye cotton the tints given in column III.

| I | II | III |
|---|---|---|
| 1 | ![naphthalene-1,5-disulfonic acid azo 4-amino-2-methylphenyl] | Reddish yellow. |
| 2 | ![naphthalene-disulfonic acid azo 4-amino-2-acetamidophenyl] | Do. |
| 3 | ![naphthalene-disulfonic acid azo 4-amino-2-methyl-3-methoxyphenyl] | Do. |
| 4 | ![naphthalene-disulfonic acid azo 4-amino-2-acetamidophenyl] | Do. |
| 5 | ![3,5-dichloro-4-sulfophenyl pyrazolone azo 4-amino-2-sulfophenyl] | Do. |
| 6 | ![phenyl-3-sulfo azo pyrazolone with 4-aminophenyl and CO₂H] | Yellow. |

| I | II | III |
|---|---|---|
| 7 | HO₃S—[naphthalene(SO₃H)]—N=N—[naphthalene(OH)(SO₃H)(NH₂)] | Reddish orange. |
| 8 | [benzene(COOH)]—N=N—[naphthalene(OH)(SO₃H)(NH₂)] | Orange. |
| 9 | [benzene(HO₃S)(NH₂)]—N=N—[naphthalene(OH)(HO₃S)(NH₂)] | Yellowish red. |
| 10 | [benzene(SO₃H)]—N=N—[naphthalene(SO₃H)]—N=N—[benzene(NH₂)] | Reddish brown. |
| 11 | CH₃O—[benzene]—N=N—[benzene(SO₃H)]—CH=CH—[benzene(SO₃H)(NH₂)] | Yellow. |
| 12 | O₂N—[benzene(SO₃H)]—CH=CH—[benzene(SO₃H)]—N=N—[benzene(NHCH₃)] | Do. |
| 13 | copper complex of: [benzene(OH)(SO₃H)]—N=N—[naphthalene(OH)(HO₃S)(NH₂)] | Ruby. |
| 14 | 1:2-cobalt complex of: [benzene(OH)(SO₃H)]—N=N—[naphthalene(OH)(HO₃S)(NH₂)] | Bordeaux. |
| 15 | 1:2-chromium complex of: [benzene(OH)(SO₃H)]—N=N—[naphthalene(OH)(HO₃S)(NH₂)] | Currant. |
| 16 | 1:2-cobalt complex of: HO₃S—[naphthalene(OH)(NO₂)]—N=N—[naphthalene(OH)(HO₃S)(NH₂)] | Grey-brown. |

| I | II | III |
|---|---|---|
| 17 | 1:2-chromium complex of: [naphthalene with OH, HO₃S, NO₂ groups, azo-linked to naphthalene with OH, HO₃S, NH₂ groups] | Greenish grey. |
| 18 | 1:2-chromium complex of: [benzene with NH₂, COOH azo-linked to naphthalene with OH, HO₃S, NH-phenyl-SO₂H] | Black-brown. |
| 19 | 1:2-cobalt complex of: [pyrazolone structure with phenyl-SO₃H, CH₃, azo-linked to benzene with OH, NH₂, SO₃H] | Brownish yellow. |
| 20 | HO₃S—[benzene with NO₂]—NH—[benzene]—NH₂ | Yellowish brown. |
| 21 | [anthraquinone-type structure with NH₂, SO₃H, NH-phenyl-NH₂] | Greenish blue. |
| 22 | [anthraquinone structure with HO₃S, NH₂, SO₃H, NH-phenyl-NH₂] | Do. |
| 23 | CuPh(3) {(SO₂NH—[benzene]—NH₂)₁ ; (SO₃H)₃} | Turquoise blue. |
| 24 | [dioxazine structure with SO₃H, Cl, NH-phenyl-NH₂ groups on both sides] | Blue. |
| 25 | [thioxanthone structure with NH-phenyl-SO₃H, NH₂] | Yellow. |
| 26 | [aminophenyl—N=N—pyrazolone with OH, CH₃, N-phenyl(Cl, SO₃H)] | Greenish yellow. |

Example 3

13.05 parts of the monosodium salt of 2-amino-5-oxy-naphthalene-7-sulfonic acid are dissolved in 300 parts of water and 15 parts of anhydrous sodium acetate are added. To the solution so obtained is added a solution of 13.08 parts of 3:4:5:6-tetrachloropyridazine in 150 parts of alcohol, and the reaction mixture is heated for a few hours at 70 to 75° C. until the amino group of the 2-amino-5-oxynaphthalene-7-sulfonic acid can no longer be detected. By the addition of sodium chloride the reaction product formed is completely precipitated.

The intermediate product so obtained can be used as a coupling component. When coupled, for example, with diazotized 2-amino-benzene-sulfonic acid it yields a dyestuff which dyes cotton by the method described in Example 4 orange tints.

Example 4

2 parts of the dyestuff obtained as described in the first and second paragraphs of Example 1 are mixed with 20 parts of urea, and the mixture is dissolved in 28 parts of water and the solution is stirred into 40 parts of a sodium alginate thickening of 5% strength. There are then added 10 parts of a sodium carbonate solution of 10% strength.

A cotton fabric is printed with the above printing composition on a roller printing machine, and the print is dried and steamed for 8 minutes at 100° C. in saturated steam. The printed material is then thoroughly rinsed in cold and hot water and dried.

Example 5

2 parts of the dyestuff obtained as described in the first and second paragraphs of Example 2 are mixed with 20 parts of urea, and the mixture is dissolved in 100 parts of water. After the addition of 2 parts of sodium carbonate, a cotton fabric is impregnated with the solution, and is then squeezed to a weight increase of 75% and dried. The cotton is then subjected for 5 minutes to dry heat at 140° C., and is then rinsed, soaped at the boil, rinsed and dried.

Example 6

2 parts of dyestuff No. 21 of the table in Example 2 are dissolved in 400 parts of water, 10 parts of crystalline sodium sulfate are added, and 100 parts of well-wetted wool are entered into the dyebath at 40 to 50° C. 2 parts of acetic acid of 40% strength are then added, the bath is brought to the boil in the course of half an hour, and dyeing is carried on for ¾ of an hour at the boil. Finally the wool is rinsed with cold water and dried. The wool is dyed a reddish-blue tint which is fast to washing and is of good fastness to light.

We claim:

1. A water-soluble organic dyestuff which contains at least 2 sulfonic acid groups and corresponds to the formula

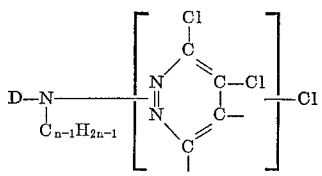

wherein D represents the radical of a member selected from the group consisting of anthraquinone, phthalocyanine, stilbene, nitro, oxazine, thioxanthone and azo-dyestuff containing at most three azo groups, $n$ represents a whole number up to 6, and wherein the pyridazinylamino group is directly bound to a phenyl nucleus of the dyestuff molecule.

2. A water-soluble organic dyestuff of the formula

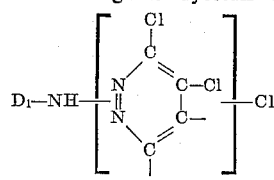

in which $D_1$ is the radical of an azo dyestuff molecule containing at least two sulfonic acid groups and at most two azo groups, and wherein the pyridazinylamino group is directly bound to a phenyl nucleus of the dyestuff molecule.

3. A water-soluble anthraquinone dyestuff containing two sulfonic acid groups and a radical of the formula

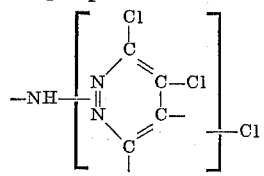

4. A complex metal compound containing a metal selected from the group consisting of copper, cobalt and chromium bound in complex union with a monoazo-dyestuff according to claim 2.

5. The monoazo dyestuff corresponding to the formula

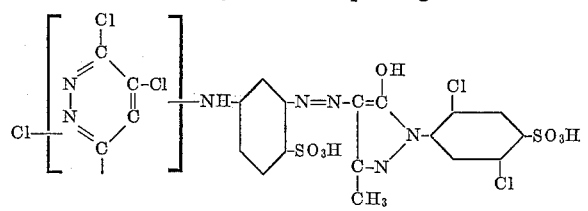

6. The monoazo dyestuff corresponding to the formula

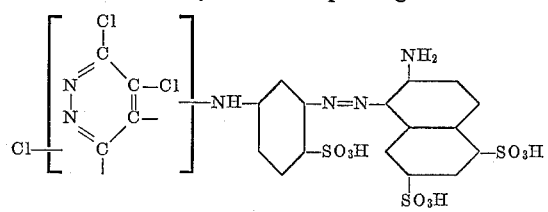

7. The monoazo dyestuff corresponding to the formula

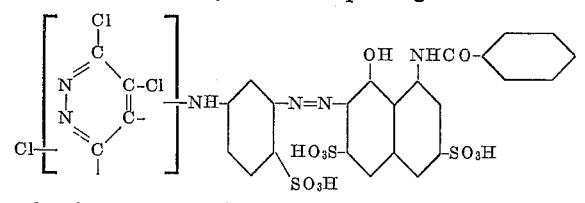

8. The monoazo dyestuff corresponding to the formula

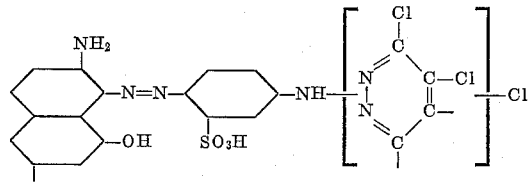

9. A complex copper compound containing one atom of copper in complex union with substantially one molecule of a monoazo dyestuff of the formula

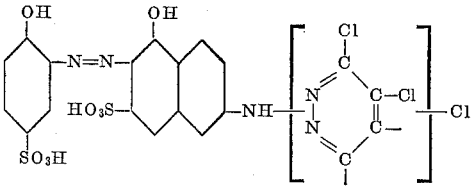

10. A complex cobalt compound containing one atom of cobalt in complex union with substantially two molecules of a monoazo dyestuff of the formula

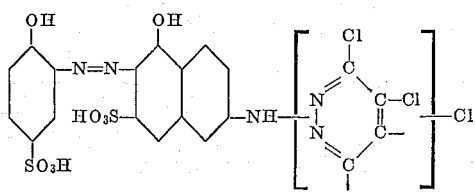

11. An anthraquinone dyestuff corresponding to the formula

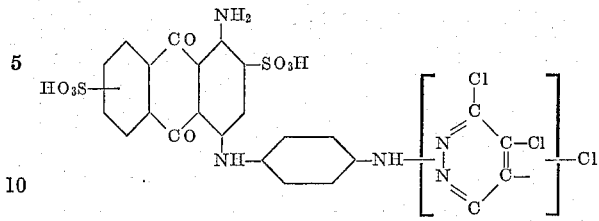

12. A disazo dyestuff corresponding to the formula

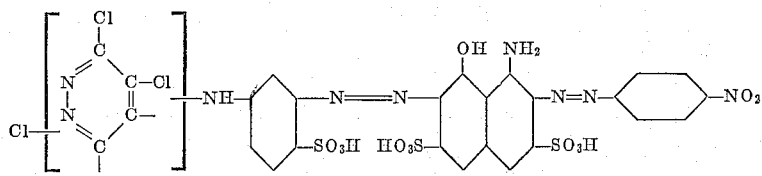

References Cited in the file of this patent

UNITED STATES PATENTS

| | | |
|---|---|---|
| 1,886,480 | Haller et al. | Nov. 8, 1932 |

FOREIGN PATENTS

| | | |
|---|---|---|
| 1,182,006 | France | June 22, 1959 |
| 822,948 | Great Britain | Nov. 4, 1959 |
| 1,221,621 | France | June 2, 1960 |
| 1,225,281 | France | June 30, 1960 |
| 1,247,660 | France | Oct. 24, 1960 |

UNITED STATES PATENT OFFICE
CERTIFICATE OF CORRECTION

Patent No. 3,127,389　　　　　　　　　　　March 31, 1964

Karl Seitz et al.

It is hereby certified that error appears in the above numbered patent requiring correction and that the said Letters Patent should read as corrected below.

Column 14, lines 29 to 35, for that portion of the formula reading

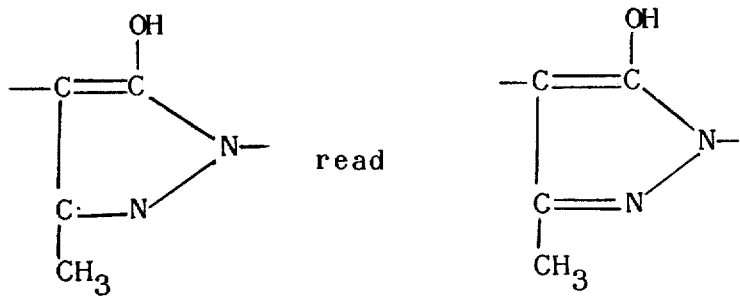

Signed and sealed this 4th day of August 1964.

(SEAL)
Attest:

ERNEST W. SWIDER　　　　　　　　　　　EDWARD J. BRENNER

Attesting Officer　　　　　　　　　　　Commissioner of Patents